United States Patent
Maten et al.

(10) Patent No.: US 8,206,265 B2
(45) Date of Patent: Jun. 26, 2012

(54) CONTROL SYSTEM FOR DUAL CLUTCH TRANSMISSION

(75) Inventors: John R. Maten, Royal Oak, MI (US); Kevin Michael Dougan, Plymouth, MI (US); Richard T. Tamba, Castle Hill (AU); Darren Firth, West Pennant Hills (AU)

(73) Assignee: GM Global Technology Operations LLC, Detroit, MI (US)

( * ) Notice: Subject to any disclaimer, the term of this patent is extended or adjusted under 35 U.S.C. 154(b) by 755 days.

(21) Appl. No.: 12/254,965

(22) Filed: Oct. 21, 2008

(65) Prior Publication Data
US 2010/0099537 A1 Apr. 22, 2010

(51) Int. Cl.
*F16H 61/26* (2006.01)
*F16H 61/00* (2006.01)
*B60W 10/02* (2006.01)

(52) U.S. Cl. .................... 477/130; 477/143; 192/3.61
(58) Field of Classification Search ............ 477/130, 477/413, 150, 156, 127; 192/3.54, 3.55, 192/3.57, 3.61; 74/329, 330, 331, 335, 340
See application file for complete search history.

(56) References Cited

U.S. PATENT DOCUMENTS

| | | | | |
|---|---|---|---|---|
| 4,432,255 A * | 2/1984 | Borman et al. | | 477/128 |
| 5,347,879 A * | 9/1994 | Ordo | | 74/331 |
| 5,454,763 A * | 10/1995 | Ikebuchi et al. | | 475/128 |
| 5,622,080 A * | 4/1997 | Furukawa | | 74/335 |
| 6,090,008 A * | 7/2000 | Hoshiya et al. | | 477/84 |
| 6,427,547 B1 * | 8/2002 | Bowen | | 74/329 |
| 7,127,961 B2 * | 10/2006 | Braford et al. | | 74/340 |
| 7,263,907 B2 * | 9/2007 | Stevenson | | 74/340 |
| 7,410,438 B2 * | 8/2008 | Moehlmann et al. | | 475/116 |
| 7,752,935 B2 * | 7/2010 | Vernacchia et al. | | 74/335 |
| 7,896,770 B2 * | 3/2011 | Earhart et al. | | 475/218 |
| 2006/0234826 A1 * | 10/2006 | Moehlmann et al. | | 476/10 |
| 2007/0068297 A1 * | 3/2007 | Hori et al. | | 74/335 |
| 2008/0047379 A1 * | 2/2008 | Borgerson et al. | | 74/331 |
| 2008/0190228 A1 * | 8/2008 | Long et al. | | 74/331 |
| 2008/0216908 A1 * | 9/2008 | Vernacchia et al. | | 137/628 |
| 2009/0321209 A1 * | 12/2009 | Grethel et al. | | 192/70.12 |
| 2010/0096232 A1 * | 4/2010 | Buchanan et al. | | 192/3.61 |
| 2011/0094610 A1 * | 4/2011 | Yagi | | 137/885 |

FOREIGN PATENT DOCUMENTS
WO WO2009128806 A1 * 10/2009
* cited by examiner

*Primary Examiner* — Roger Pang

(57) ABSTRACT

The present invention provides a control system for a dual clutch automatic transmission having a torque converter. The transmission provides seven forward speeds or gear ratios and reverse. The control system includes a hydraulic pump, a pressure regulator assembly and control valves that provide and release pressurized hydraulic fluid to the torque converter, a pair of input clutches and eight synchronizer clutches. A first pair of control valves are high flow rate valves which are capable of rapidly engaging and disengaging the input clutches. A second pair of high flow rate valves, control valves and spool valves provide a branching control circuit which controls engagement and disengagement of the synchronizer clutches. A control valve linked to the shift lever blocks hydraulic fluid flow to the first pair of high flow rate valves to inhibit input clutch activation when the shift lever is in Park or Neutral.

20 Claims, 4 Drawing Sheets

US 8,206,265 B2

CONTROL SYSTEM FOR DUAL CLUTCH TRANSMISSION

FIELD

The present disclosure relates to control systems for automatic transmissions and more particularly to a control system for a dual clutch automatic transmission having a torque converter.

BACKGROUND

The statements in this section merely provide background information related to the present disclosure and may or may not constitute prior art.

Within the motor vehicle automatic transmission art, the dual clutch transmission (DCT) is a relative newcomer. A typical dual clutch transmission configuration includes a pair of mutually exclusively operating input clutches which drive a pair of layshafts or countershafts disposed on opposite sides of an output shaft. One of each of a plurality of pairs of constantly meshing gears which define the various forward gear ratios is freely rotatably disposed on one of the layshafts and the other of each pair of gears is coupled to the output shaft. A like plurality of synchronizer clutches selectively couple one of the gears on the layshaft to the layshaft to achieve a forward gear ratio. After the synchronizer clutch is engaged, the input clutch associated with the active layshaft is engaged. Reverse gear is similarly achieved except that it includes an extra gear to provide torque reversal.

Dual clutch transmissions are known for their sporty, performance oriented characteristics. They typically exhibit good fuel economy due to good gear mesh efficiency and ratio selection flexibility. The synchronizer clutches have low spin losses which also contributes to overall operating efficiency.

However, dual clutch transmissions have several unique design considerations. For example, because of the heat that can be generated during slip, the input clutches must be of a relatively large size. Furthermore, such heat generation typically requires correspondingly large and complex cooling circuits capable of dissipating relatively large quantities of heat. Finally, because such transmissions typically have many sets of axially aligned, intermeshing gears, their overall axial length may limit their use in some vehicle designs.

One alternative to utilizing only a pair of input clutches in a dual clutch transmission to achieve launch and torque throughput control is to incorporate a torque converter. While such an addition to a dual clutch transmission simplifies launch considerations and can reduce the required torque capacity and size of the input clutches, it may have an adverse impact on performance and fuel economy. Due to the additional complexity of the device, improving the performance and fuel economy of a dual clutch transmission having a torque converter presents a challenge. The challenge is addressed herein with an invention directed to a control system for a dual clutch transmission having a torque converter.

SUMMARY

The present invention provides a control system for a dual clutch transmission having a torque converter. The transmission provides seven forward speeds or gear ratios and reverse. The control system includes a hydraulic pump, a pressure regulator assembly and a plurality of control valves that provide and release pressurized hydraulic fluid to the torque converter, a pair of input clutches and a plurality of synchronizer clutches. A first pair of control valves are high flow rate valves which are capable of rapidly engaging and disengaging the input clutches. Two additional high flow rate control valves are used in conjunction with other control valves and spool valves to provide a branching control circuit which controls engagement and disengagement of eight synchronizer clutches. A control valve mechanically linked to the shift lever blocks hydraulic fluid flow to the high flow rate valves associated with the input clutches to inhibit activation of the clutches when the shift lever is in Park or Neutral.

It is thus an object of the present invention to provide a dual clutch transmission having seven forward speeds or gear ratios and reverse.

It is a further object of the present invention to provide a dual clutch transmission having a torque converter.

It is a still further object of the present invention to provide a dual clutch transmission having high flow rate valves which are capable of rapidly engaging the input clutches and synchronizer clutches.

It is a still further object of the present invention to provide a dual clutch transmission having a branching hydraulic control circuit which controls engagement of the synchronizer clutches.

It is a still further object of the present invention to provide a dual clutch transmission having a control valve linked to a shift lever which blocks hydraulic fluid flow to the valves associated with the input clutches to inhibit activation of the clutches when the shift lever is in Park or Neutral.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It will be appreciated that a hydraulic control system according to the present is designed and intended for use with a dual clutch automatic transmission such as disclosed in co-owned U.S. Pat. No. 7,263,907 which is hereby fully incorporated by reference.

Figure 1A:
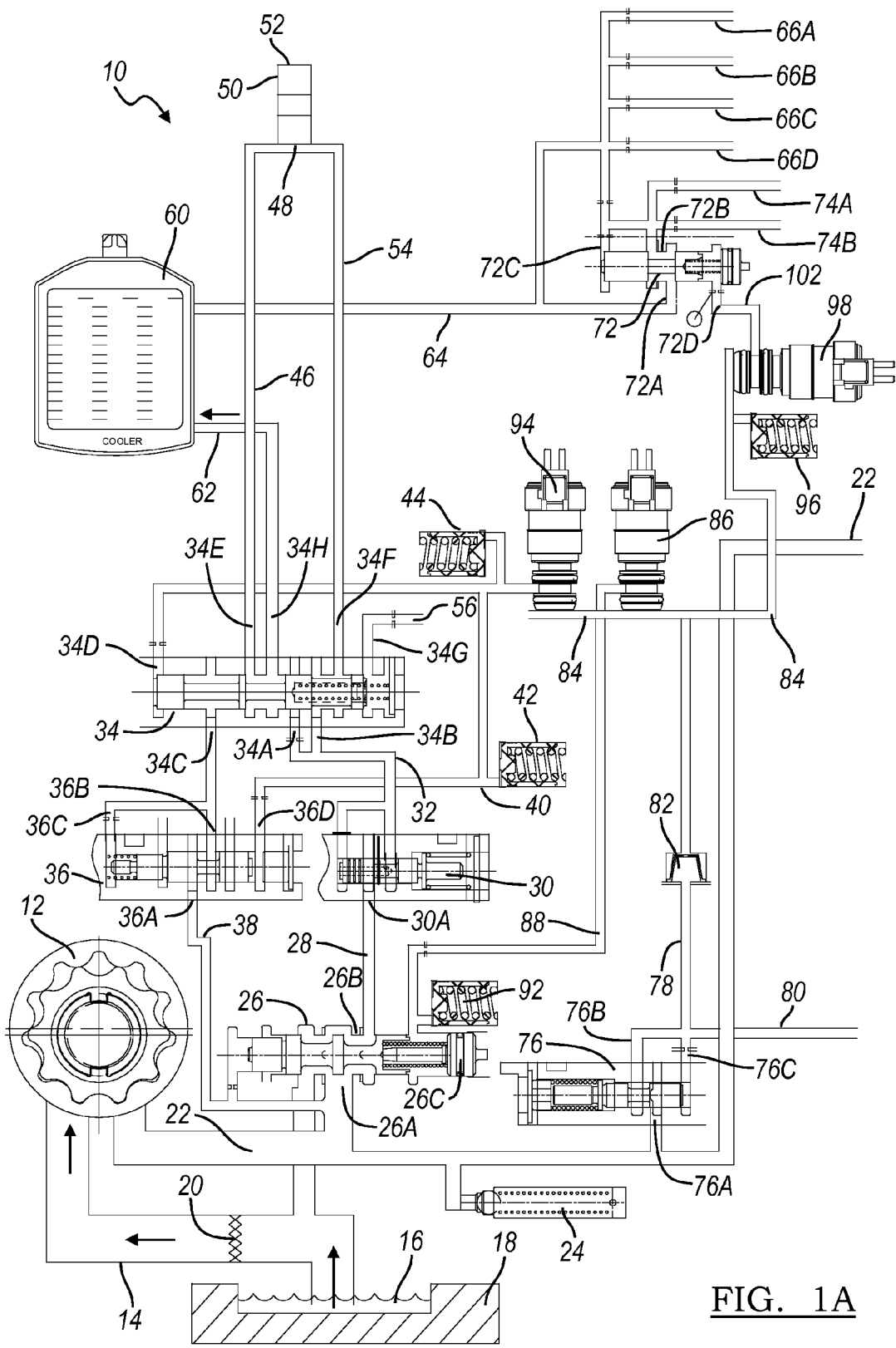
FIG. 1A is a first portion of a hydraulic fluid flow diagram of a control system according to the present invention for a dual clutch automatic transmission having a torque converter.

With reference now to FIG. 1A, a hydraulic control system for a dual clutch automatic transmission having a torque converter is illustrated and generally designated by the reference number 10. The hydraulic control system 10 includes a transmission control module (TCM) 11 having inputs for receiving data from various sources and sensors in the vehicle and transmission, memory devices for storing software and data, one or more microprocessors and control and data outputs. The hydraulic control system 10 also includes a hydraulic pump 12 such as a gerotor pump which draws hydraulic fluid through a suction line 14 from a sump 16 disposed at the bottom of a transmission housing 18. Preferably, a filter 20 is disposed in the suction line 14 between the sump 16 and the hydraulic pump 12. The pressurized hydraulic fluid output of the hydraulic pump 12 is provided to a main supply line 22 which communicates with the various control valves of the control system 10 as will be described subsequently. A line pressure relief valve 24 which is a conventional ball and spring configuration is in fluid communication with the main supply line 22 and opens to release pressure in the main supply line 22 if the pressure exceeds a predetermined maximum value plus a safety margin.

Pressurized hydraulic fluid in the main supply line 22 is provided to an inlet port 26A of a primary pressure regulator 26. The primary pressure regulator 26 provides hydraulic fluid at a controlled pressure between predetermined minimum and maximum values at an outlet port 26B to a line 28 to an inlet port 30A of a converter feed limit valve 30. The converter feed limit valve 30 provides hydraulic fluid at a controlled pressure in a line 32 to two input ports 34A and 34B of a torque converter clutch control valve 34.

Hydraulic fluid from the main supply line 22 is also provided to an input port 36A of a torque converter apply regulator 36 in a line 38. A first output port 36B of the torque converter apply regulator 36 is connected to a first control port 36C of the torque converter apply regulator 36 and an input port 34C of the torque converter control valve 34. A third output port 36D of the torque converter apply regulator 36 is connected through a line 40 having a first fluid damper 42 to a control port 34D of the torque converter control valve 34. The line 40 also feeds hydraulic fluid to a second damper 44 more proximate the torque converter control valve 34. The torque converter control valve 34 also includes a first or apply port 34E which provides pressurized hydraulic fluid in a line 46 to a hydraulic actuator 48 of a lock up clutch 50 of a torque converter 52. The torque converter control valve 34 also includes a second or release port 34F which receives exhaust hydraulic fluid in a line 54 from the lock up clutch hydraulic actuator 48 and returns to the sump 16 through an outlet port 34G and a return line 56. A more detailed explanation of the operation of the lock up clutch 50 of the torque converter 52 appears in co-owned U.S. Pat. No. 5,484,354 to Vukovich et al., which is hereby fully incorporated by reference.

A hydraulic fluid cooler 60 is supplied with hydraulic fluid from an outlet port 34H of the torque converter control valve 34 through a line 62 and returns lower temperature hydraulic fluid to the control system 10 in a return line 64. Hydraulic fluid in the return line 64 is provided to a plurality of passageways 66A, 66B, 66C and 66D which provide lubricating hydraulic fluid to a spray bar, the shafts and the clutches of an automatic transmission 70. Hydraulic fluid is also provided to an inlet port 72A of a lubrication control regulator 72. The lubrication control regulator 72 includes an outlet port 72B which provides lubricating hydraulic fluid to an additional pair of passageways 74A and 74B and a control port 72C.

The main supply line 22 also provides pressurized hydraulic fluid to an inlet port 76A of an actuator feed limit valve 76. The actuator feed limit valve 76 includes an outlet port 76B which provides hydraulic fluid at a pressure at or below a predetermined maximum value in a line 78 which communicates with a control port 76C of the actuator feed limit valve 76 and a first branching supply line 80. The line 78 provides hydraulic fluid through a filter 82 to a second branching supply line 84. One branch of the second supply line 84 provides hydraulic fluid to a first modulatable solenoid valve 86. The output of the modulatable solenoid valve 86 is provided to a line 88 which feeds a third damper 92 and a port 26C of the primary pressure regulator 26. The same branch of the second supply line 84 provides hydraulic fluid to a second modulatable or variable bleed solenoid valve 94. The second modulatable or variable bleed solenoid valve 94 provides hydraulic fluid to the second damper 44 and the line 40. The other branch of the second supply line 84 provides hydraulic fluid to a fourth damper 96 and a third modulatable or variable bleed solenoid valve 98. The output of the third modulatable or variable bleed solenoid valve 98 is provided to an inlet port 72D of the lubrication control regulator 72 through a line 102.

Input Clutch Hydraulic Circuit

Figure 1B:
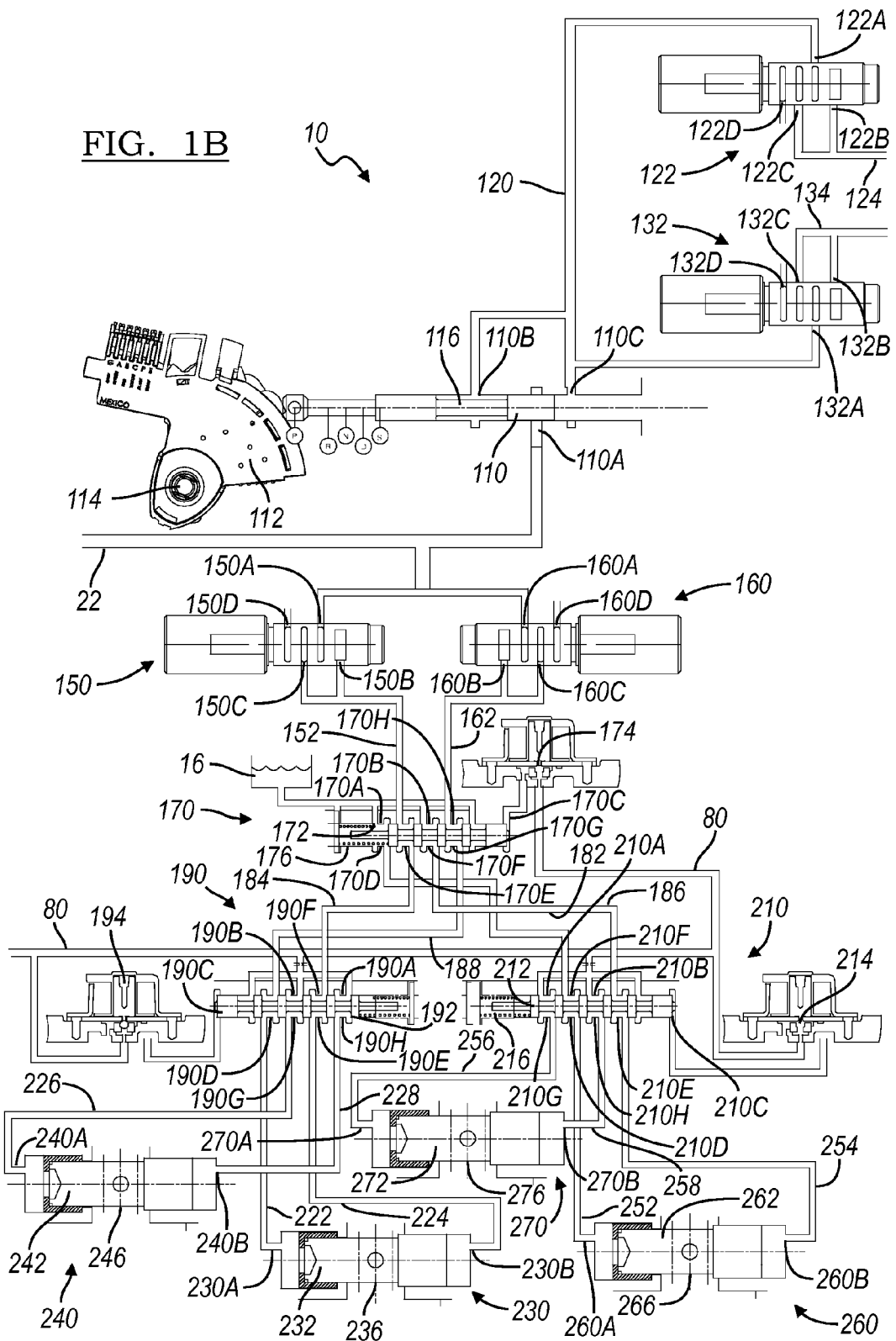
FIG. 1B is a second portion of a hydraulic fluid flow diagram of a control system according to the present invention for a dual clutch automatic transmission having a torque converter.

Referring now to FIG. 1B, the main supply line 22 provides a flow of pressurized hydraulic fluid to an inlet port 110A of a manual valve 110. The manual valve 110 is coupled to and translated by a selector plate 112 which is rotated by the selector shaft 114 of the transmission 70 and is directly controlled by the vehicle operator through the gearshift lever and gearshift linkage (both not illustrated). The manual valve 110 includes a valve spool 116 and a pair of spaced apart outlet ports 110B and 110C. When the gearshift, the selector plate 112 and the valve spool 116 of the manual valve 110 are in one of two positions corresponding to Park or Neutral, the valve spool 116 positively blocks the flow of pressurized hydraulic fluid from the inlet port 110A to the outlet ports 110B and 110C preventing clutch engagement. The manual valve 110 will exhaust hydraulic fluid from the clutches in Park but will not exhaust fluid from the clutches in Neutral. Conversely, when the gearshift, the selector plate 112 and the valve spool 116 of the manual valve 110 are in Drive, Super (Low) or Reverse, the valve spool 116 allows hydraulic fluid flow from the inlet port 110A to one or the other of the outlet ports 110B and 110C and to a clutch supply line 120.

Figure 3:
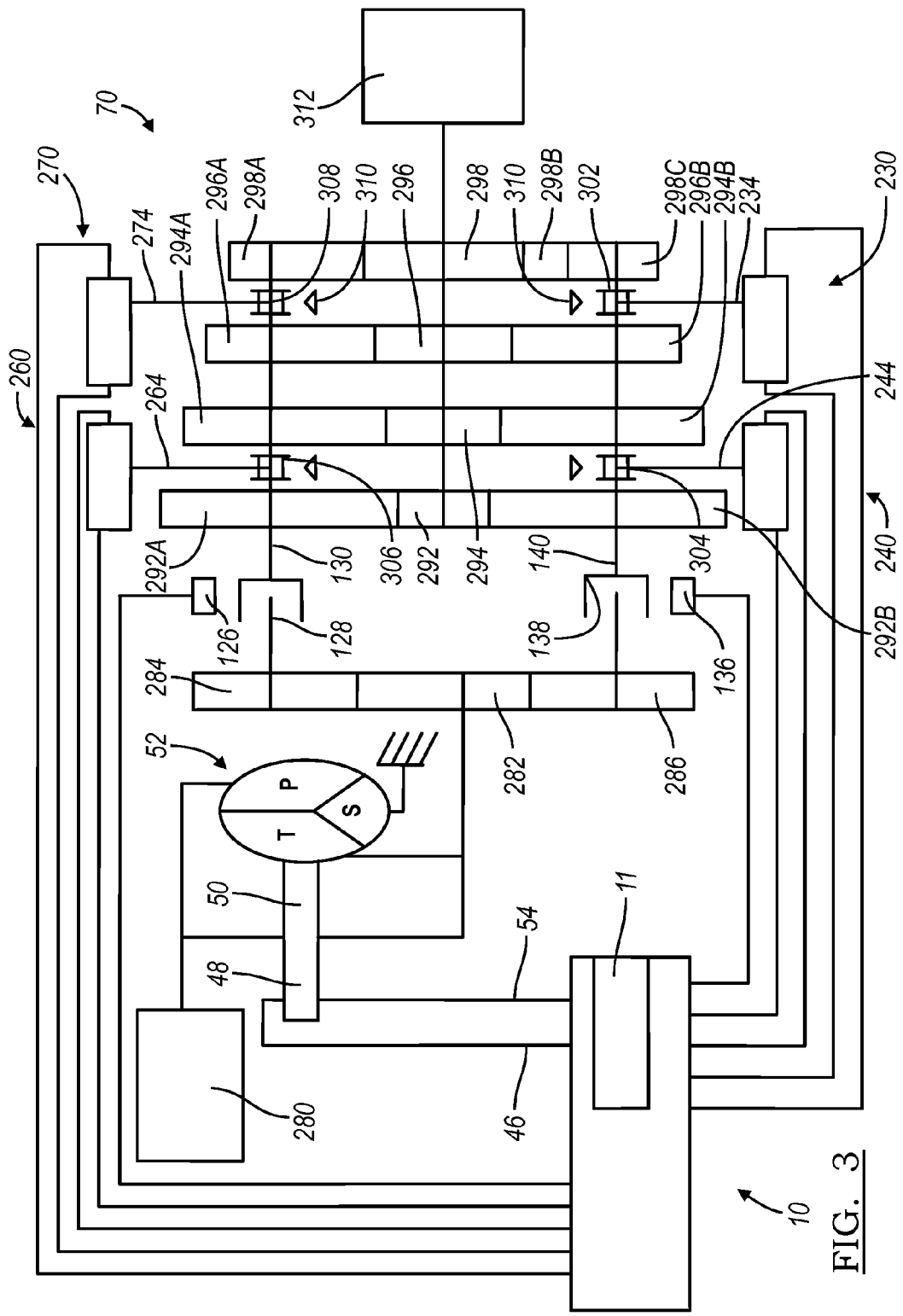
FIG. 3 is a diagrammatic view of a dual clutch automatic transmission having a torque converter for use with a control system according to the present invention.

Referring now to FIGS. 1B and 3, pressurized hydraulic fluid in the clutch supply line 120 is provided to an inlet port 122A of a first or odd clutch actuator control valve 122. The first or odd clutch actuator control valve 122 is a responsive, high capacity (flow rate) variable force solenoid valve which selectively provides pressurized hydraulic fluid through an outlet port 122B and a first clutch supply line 124 to a first hydraulic clutch operator 126 which engages a first friction clutch pack 128 to provide drive torque to a first lay shaft or countershaft 130 associated with the odd numbered gears (1, 3, 5 and 7) of the automatic transmission 70. When the first or odd clutch actuator control valve 122 releases pressure to the first hydraulic clutch operator 126, hydraulic fluid returns to the first clutch actuator control valve 122 through a return port 122C and is routed to an exhaust port 122D and returned to the sump 16.

Pressurized hydraulic fluid in the clutch supply line 120 is also provided to an inlet port 132A of a second or even clutch actuator control valve 132. The second or even clutch actuator control valve 132 is also a responsive, high capacity variable force solenoid valve which selectively provides pressurized hydraulic fluid through an outlet port 132B and a second clutch supply line 134 to a second hydraulic clutch operator 136 which engages a second friction clutch pack 138 to provide drive torque to a second lay shaft or countershaft 140 associated with the even numbered gears (R, 2, 4 and 6) of the automatic transmission 70. When the second or even clutch actuator control valve 132 releases pressure to the second hydraulic clutch operator 136, hydraulic fluid returns to the second clutch actuator control valve 132 through a return port 132C and is routed to an exhaust port 132D and returned to the sump 16.

Synchronizer Clutch Hydraulic Circuit

The lower portion of FIG. 1B relates to the arrangement of the control valves for the actuators and shift rails that engage the various synchronizer clutches of the automatic transmission 70 which provide seven forward speeds or gear ratios and reverse. Pressurized hydraulic fluid in the main supply line 22 is provided to an inlet port 150A of a first high capacity (flow rate) linear solenoid control valve 150. The first linear solenoid control valve 150 selectively provides pressurized hydraulic fluid through an outlet port 150B to a first actuator supply line 152. Also in communication with the first actuator supply line 152 is a return port 150C through which hydraulic fluid may be returned to the first high capacity linear solenoid control valve 150 and an exhaust port 150D. Similarly, pressurized hydraulic fluid in the main supply line 22 is provided to an inlet port 160A of a second high capacity (flow rate) linear solenoid control valve 160. The second linear solenoid control valve 160 selectively provides pressurized hydraulic fluid through an outlet port 160B to a second actuator supply line 162. Also in communication with the second actuator supply line 162 is a return port 160C through which hydraulic fluid may be returned to the second high capacity linear solenoid control valve 160 and an exhaust port 160D.

Both the first actuator supply line 152 and the second actuator supply line 162 communicate with the inlet ports of a first two-position actuator control valve 170. The first actuator supply line 152 communicates with a first inlet port 170A and the second actuator supply line 162 communicates with a second inlet port 170B. The first two-position actuator control valve 170 includes a spring biased valve spool 172 which is translated to the left as illustrated in FIG. 1B by pressurized hydraulic fluid selectively provided to a first control port 170C from the first branching supply line 80 by a first two-position solenoid valve 174 when it is energized. When the first two-position solenoid valve 174 is de-energized, hydraulic fluid is exhausted through the first control port 170C and the valve spool 172 translates to the right due to the force of a compression spring 176.

The first two-position actuator control valve 170 includes four outlet ports: a first outlet port 170D which supplies hydraulic fluid to a first control line 182, a second outlet port 170E which supplies hydraulic fluid to a second control line 184, a third outlet port 170F which supplies hydraulic fluid to a third control line 186 and a fourth outlet port 170G which supplies hydraulic fluid to a fourth control line 188. The first two-position actuator control valve 170 also includes four exhaust ports 170H, one of which is associated with each of the outlet ports 170D 170E, 170F, and 170G. When the first two-position solenoid valve 174 is de-energized and the valve spool 172 translates to the right, to a first position, as illustrated in FIG. 1B, the second control line 184 and the fourth control line 188 selectively provide pressurized hydraulic fluid to a second two-position actuator control valve 190. When the first two-position solenoid valve 174 is energized and the valve spool 172 translates to the left, to a second position, the first control line 182 and the third control line 186 selectively provide pressurized hydraulic fluid to a third two-position actuator control valve 210.

When the valve spool 172 of the first two-position actuator control valve 170 is in its first position, to the right as illustrated in FIG. 1B, pressurized hydraulic fluid is supplied to the second two-position actuator control valve 190 through the second control line 184 and the fourth control line 188 while the first control line 182 and the third control line 186 are exhausted through the exhaust ports 170H. Similarly, when the valve spool 172 of the first two-position actuator control valve 170 is in its second position, to the left, pressurized hydraulic fluid is supplied to the third two-position actuator control valve 210 through the first control line 182 and the third control line 186 while the second control line 184 and the fourth control line 188 are exhausted through the exhaust ports 170H. It will be appreciated that at this location of the hydraulic control system 10, four separate synchronizer and clutch engaging hydraulic fluid flows exist. Moreover, it should be appreciated that during gear selection and engagement events, only one of the second control line 184 and the fourth control line 188 will carry pressurized hydraulic fluid to the second two-position actuator control valve 190 and, similarly at any given time, only one of the first control line 182 and the third control line 186 will carry pressurized hydraulic fluid to the third two-position actuator control valve 210.

The second two-position actuator control valve 190 receives independently controlled and mutually exclusive flows of pressurized hydraulic fluid in a first inlet port 190A associated with the second control line 184 and a second inlet port 190B associated with the fourth control line 188. The second two-position actuator control valve 190 includes a spring biased valve spool 192 which is translated to a first position, to the left as illustrated in FIG. 1B, by a compression spring 196. A second two-position solenoid valve 194 selectively provides pressurized hydraulic fluid to a first control port 190C from the first branching supply line 80 when it is energized to translate the valve spool 192 to a second position, to the right. When the second two-position solenoid valve 194 is de-energized, hydraulic fluid is exhausted through the first control port 190C and the compression spring 196 returns the valve spool 192 to the first position.

The third two-position actuator control valve 210 likewise receives independently controlled and mutually exclusive flows of pressurized hydraulic fluid in a first inlet port 210A associated with the first control line 182 and a second inlet port 210B associated with the third control line 186. The third two-position actuator control valve 210 includes a spring biased valve spool 212 which is translated to the right, to a first position as illustrated in FIG. 1B, by a compression spring 216. A third two-position solenoid valve 214 selectively provides pressurized hydraulic fluid to a first control port 210C from the first branching supply line 80 when it is energized to translate the valve spool 212 to the left, to a second position. When the third two-position solenoid valve 214 is de-energized, hydraulic fluid is exhausted through the first control port 210C and the compression spring 216 returns the valve spool 212 to the first position.

Hydraulic Circuit for Even Numbered Gears

Referring now to FIGS. 1B and 3 and returning to the second two-position actuator control valve 190, when the valve spool 192 of the second actuator control valve 190 is in its first position, to the left, pressurized hydraulic fluid is selectively provided by the second linear solenoid control valve 160 and the first actuator control valve 170 to a first outlet port 190D, through a first actuator control line 222 and to a first inlet port 230A of a first three-position hydraulic actuator 230. The first three-position hydraulic actuator 230 selects Reverse or Second gear. Pressurized hydraulic fluid may also be selectively provided to the first three-position hydraulic actuator 230 by the first linear solenoid control valve 150 and the first two-position actuator control valve 170 to a second outlet port 190E of the second two-position actuator control valve 190, through a second actuator control line 224 and to a second inlet port 230B. The first three-position hydraulic actuator 230 as well as three additional gear selecting hydraulic actuators are a three piston configuration which positively achieves an intermediate, neutral position and two end or limit positions in which gears are engaged. The first three-position hydraulic actuator 230 includes a first piston assembly 232 which is coupled to and translates a first shift rail and fork assembly 234 which engages, in a first position or limit of travel, Reverse gear; in a second or intermediate position, Neutral and in a third position or opposite limit of travel, Second gear. The first hydraulic actuator 230 also includes a first linear position sensor 236 which provides real time data to the transmission control module 11 regarding the position of the first piston assembly 232 and, since it is directly coupled to it, the position of the first shift rail and fork assembly 234 and associated synchronizer clutch. With the valve spool 192 in the first position, pressurized fluid from the supply line 80 and third inlet ports 190F is also fed through a third outlet port 190G of the second two-position actuator control valve 190 to a third actuator control line 226 and to a first inlet port 240A of a second three-position hydraulic actuator 240 as well as through a fourth outlet port 190H to a fourth actuator control line 228 and to a second inlet port 240B of the second three-position actuator 240. The second three-position hydraulic actuator 240 selects Fourth and Sixth gears. This activity moves a second piston assembly 242 and an associated second shift rail and fork assembly 244 to a neutral position.

In FIG. 1B, pressurized hydraulic fluid provided to the first inlet port 230A of the first three-position hydraulic actuator 230 from the second linear control valve 160, the first two-position actuator control valve 170, the first outlet port 190D of the second two-position actuator control valve 190 and the first control line 222 translates the first piston assembly 232 to the right, to the first position, to engage Reverse gear. When pressurized hydraulic fluid is provided to the second inlet port 230B through the first linear solenoid control valve 150, the first two-position actuator control valve 170, the second outlet port 190E of the second two-position actuator control valve 190 and the second control line 224, it translates the first piston assembly 232 to the left, to the third position, to engage Second gear. To achieve the intermediate position, i.e., Neutral, pressurized hydraulic fluid is provided from both the first linear solenoid control valve 150 and the second linear solenoid control valve 160, through the first two-position actuator control valve 170, through both the second control line 184 and the fourth control line 188, through the second two-position actuator control valve 190, both the first and second actuator control lines 222 and 224 and into the first hydraulic actuator 230.

When the second two-position solenoid valve 194 is energized, the valve spool 192 of the second two-position actuator control valve 190 moves to its second position, to the right, and pressurized hydraulic fluid is selectively provided by the second linear solenoid control valve 160 and the first two-position actuator control valve 170 to the third outlet port 190G, through the third actuator control line 226 and to the first inlet port 240A of the second three-position hydraulic actuator 240. The second three-position hydraulic actuator 240, as noted, selects Fourth and Sixth gears. Pressurized hydraulic fluid may also be selectively provided by the first linear solenoid control valve 150 and the first two-position actuator control valve 170 to the fourth outlet port 190H, through the fourth actuator control line 228 and to the fourth inlet port 240B of the second three-position hydraulic actuator 240. The second three-position hydraulic actuator 240 includes, also as noted, a second piston assembly 242 which is coupled to and translates a second shift rail and fork assembly 244 which engages, in a first position or limit of travel, Fourth gear; in a second or intermediate position, Neutral and in a third position or opposite limit of travel, Sixth gear. The second hydraulic actuator 240 also includes a first linear position sensor 246 which provides real time data to the transmission control module 11 regarding the position of the first piston assembly 242 and, since it is directly coupled to it, the position of the second shift rail and fork assembly 244 and associated synchronizer clutch. With the valve spool 192 in the second position, pressurized fluid from the supply line 80 and the third inlet ports 190F is also fed through the first outlet port 190D to the first actuator control line 222 and to the first inlet port 230A of the first three-position actuator 230 as well as through the second outlet port 190E to the second actuator control line 224 and to the second inlet port 230B of the first three-position actuator 230. This activity moves the first piston assembly 232 and the associated shift rail and fork assembly 234 to the neutral position.

In FIG. 1B, pressurized hydraulic fluid provided to the first inlet port 240A of the second three-position hydraulic actuator 240 from the second linear solenoid control valve 160, the first two-position actuator control valve 170, the third outlet port 190G of the second actuator control valve 190 and the third control line 226 translates the second piston assembly 242 to the right, to the first position, to engage Fourth gear. When pressurized hydraulic fluid is provided to the second inlet port 240B through the first linear solenoid control valve 150, the first two-position actuator control valve 170, the fourth outlet port 190H of the second actuator control valve 190 and the fourth control line 228, it translates the second piston assembly 242 to the left, to the third position, to engage Sixth gear. To achieve the intermediate position, i.e., Neutral, pressurized hydraulic fluid is provided from both the first linear solenoid control valve 150 and the second linear solenoid control valve 160, through the first two-position actuator control valve 170, through both the second control line 184 and the fourth control line 188, through the second two-position actuator control valve 190, both the third and the fourth actuator control lines 226 and 228 and into the second hydraulic actuator 240.

It will therefore be appreciated that selection or engagement of the even numbered gears Reverse, Second, Fourth and Sixth are both mutually exclusive and determined by the positions of the valve spool 172 of the first two-position actuator control valve 170, the valve spool 192 of the second two-position actuator control valve 190 and whether pressurized hydraulic fluid is being supplied to the first two-position actuator control valve 170 by the first linear solenoid control valve 150 or the second linear solenoid control valve 160.

Hydraulic Circuit for Odd Numbered Gears

The configuration of the hydraulic circuit for the odd numbered gears and its operation is similar. In order to select odd numbered gears, the first two-position solenoid valve 174 must be energized so that the first two-position actuator control valve 170, and specifically the first valve spool 172, translates to its second position, to the left in FIG. 1B. This supplies pressurized hydraulic fluid in the first control line 182 if the first linear solenoid control valve 150 is activated or in the third control line 186 if the second linear solenoid control valve 160 is activated. When the valve spool 212 of the third two-position actuator control valve 210 is in its first position, to the right in FIG. 1B, and the first linear solenoid control valve 150 is activated and the first two-position actuator control valve 170 is in its second position, to the left, pressurized hydraulic fluid is supplied to a first outlet port 210D, through a first actuator control line 252 and to a first inlet port 260A of a third three-position hydraulic actuator 260. The third three-position hydraulic actuator 260 selects First and Third gears. With the valve spool 212 in the first position, pressurized fluid from the supply line 80 and the third inlet ports 210F is also fed through a third outlet port 210G of the third two-position actuator valve 210 to the third actuator control line 256 and to a first inlet port 270A of a fourth three-position actuator 270 as well as through a fourth outlet port 210H to a fourth actuator control line 258 to a second inlet port 270B of the fourth three-position actuator 270. The fourth three-position hydraulic actuator 270 selects Fifth and Seventh gears. This activity moves a fourth piston assembly 272 and an associated fourth shift rail and fork assembly 274 to a neutral position.

The third three-position hydraulic actuator 260 includes a third piston assembly 262 which is coupled to and translates a third shift rail and fork assembly 264 which engages, in a first position or limit of travel, Third gear; in a second or intermediate position, Neutral and in a third position or opposite limit of travel, First gear. The third hydraulic actuator 260 also includes a third linear position sensor 266 which provides real time data to the transmission control module 11 regarding the position of the first piston assembly 262 and, since it is directly coupled to it, the position of the third shift rail and fork assembly 264 and associated synchronizer clutch.

The pressurized hydraulic fluid provided to the first inlet port 260A translates the third piston assembly 262 to the right, to the first position, to engage Third gear. When the first linear solenoid control valve 150 is de-energized and the second linear solenoid control valve 160 is energized, pressurized hydraulic fluid is provided through the first two-position actuator control valve 170, through the fourth control line 186, through a second outlet port 210E and a second actuator control line 254 to a second inlet port 260B of the third three-position hydraulic actuator 260. The hydraulic pressure translates the third piston assembly 262 to the left, to the third position, to engage First gear. To achieve the intermediate or Neutral position of the third piston assembly 262, both the first linear solenoid control valve 150 and the second linear solenoid control valve 160 are energized and pressurized hydraulic fluid flows through both the first control line 182 and the third control line 186, through the third two position actuator control valve 210, through the first and second actuator control lines 252 and 254 and into the third hydraulic actuator 260.

When the third two-position solenoid valve 214 is energized, the valve spool 212 of the third two-position actuator control valve 210 translates to its second position, to the left in FIG. 1B, the first linear solenoid control valve 150 is activated and the first two-position actuator control valve 170 is in its second position, to the left, pressurized hydraulic fluid is supplied to the third outlet port 210G, through the third actuator control line 256 and to the first inlet port 270A of the fourth three-position hydraulic actuator 270. The fourth three-position hydraulic actuator 270, as noted, selects Fifth and Seventh gears. The fourth three-position hydraulic actuator 270, also as noted, includes the fourth piston assembly 272 which is coupled to and translates the fourth shift rail and fork assembly 274 which engages, in a first position or limit of travel, Seventh gear; in a second or intermediate position, Neutral and in a third position or opposite limit of travel, Fifth gear. The fourth hydraulic actuator 270 also includes a fourth linear position sensor 276 which provides real time data to the transmission control module 11 regarding the position of the fourth piston assembly 272 and, since it is directly coupled to it, the position of the fourth shift rail and fork assembly 274 and associated synchronizer clutch. With the valve spool 212 in the second position, pressurized fluid from the supply line 80 is also fed through the first outlet port 210D of the third two-position actuator control valve 210, through the first actuator control line 252 to the first inlet port 260A of the third three-position actuator 260 as well as through the second outlet port 210E of the third two-position actuator control valve 210, through the second actuator control line 254 to the second inlet port 260B of the third three-position actuator 260. This activity moves the third piston assembly 262 and the associated third shift rail and fork assembly 264 to a neutral position.

The pressurized hydraulic fluid provided to the first inlet port 270A translates the fourth piston assembly 272 to the right, to the first position, to engage Third gear. When the first linear solenoid control valve 150 is de-energized and the second linear solenoid control valve 160 is energized, pressurized hydraulic fluid is provided through the first two-position actuator control valve 170, through the fourth control line 186, through a fourth outlet port 210H and a fourth actuator control line 258 to a second inlet port 270B of the fourth three-position hydraulic actuator 270. The hydraulic pressure translates the fourth piston assembly 272 to the left, to the third position, to engage Fifth gear. To achieve the intermediate or Neutral position of the fourth piston assembly 272, both the first linear solenoid control valve 150 and the second linear solenoid control valve 160 are energized and pressurized hydraulic fluid flows through both the first control line 182 and the third control line 186, through the third two-position actuator control valve 210, through the third and fourth actuator control lines 256 and 258 and into the fourth hydraulic actuator 270.

Once again, It will be appreciated that selection or engagement of the odd numbered gears First, Third, Fifth and Seventh are both mutually exclusive and determined by the positions of the valve spool 172 of the first two-position actuator control valve 170, the valve spool 212 of the third two-position actuator control valve 210 and whether pressurized hydraulic fluid is being supplied to the first two-position actuator control valve 170 by the first linear solenoid control valve 150 or the second linear solenoid control valve 160.

Figure 2:
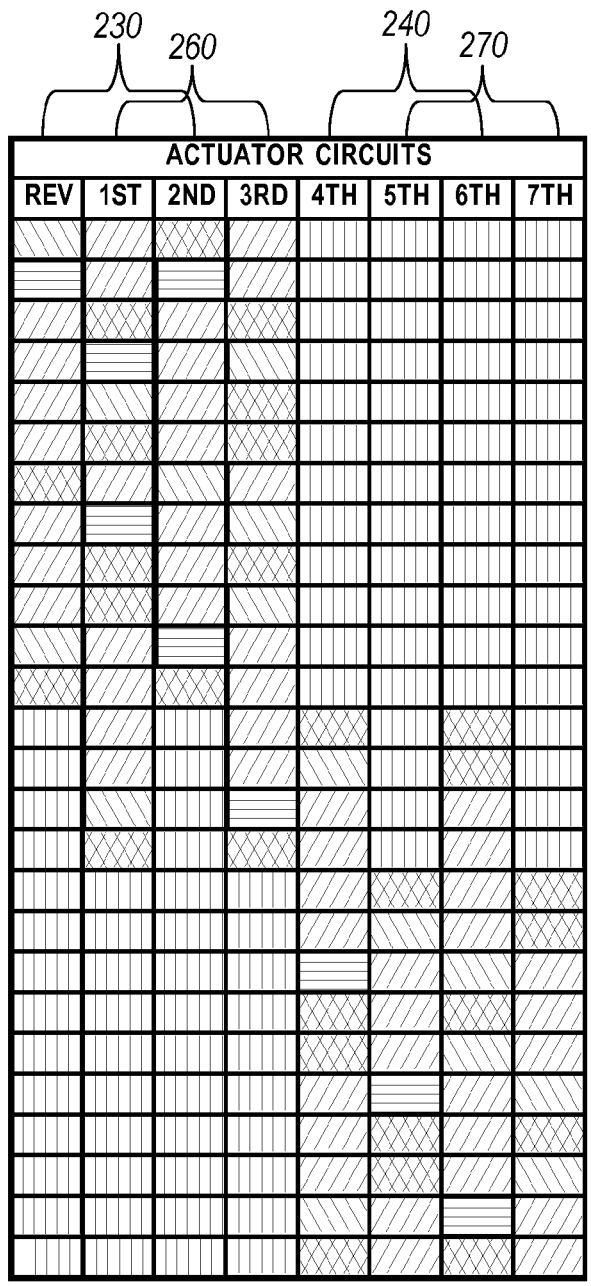
FIG. 2 is a truth table presenting the state of various control valves in a control system according to the present invention for a dual clutch automatic transmission having a torque converter.

Referring now to FIG. 2, a truth table presents the states and sequencing of the various control valves during acceleration of the automatic transmission 70 controlled by the hydraulic control system 10 of the present invention. The five vertical columns represent the five control valves 150, 160, 170, 190 and 210 and the horizontal rows indicate the various states of the control system 10 as the transmission 70 sequences from Neutral through increasingly higher speed gears. The abbreviations utilized as row designations are as follows: Eng=Engage; SS=Steady state; SSa=Steady state, phase a; SSb=Steady state, phase b; Rel #=Release (number) synchronizer. It should be appreciated that after the above states have been achieved and a desired synchronizer clutch has been engaged, the appropriate first or second clutch actuator control valve 122 or 132 is energized to engage the respective clutch pack 128 and 138 to transfer torque to the respective layshaft 130 or 140.

Referring now to FIG. 3, a hydraulic control system 10 according to the present invention and an automatic transmission 70 having a torque converter 52 are illustrated in a diagrammatic view. A prime mover such as an internal combustion engine 280 provides drive torque to the torque converter 52. A lock up clutch 48 controlled by the hydraulic control system 10 is disposed in mechanical parallel with the torque converter 52 and, when energized, positively connects the input to the output of the torque converter 52, effectively bypassing it. The output of the lock up clutch 48 and the torque converter 52 are coupled to and drive an input transfer gear 282 which is in constant mesh with a first layshaft or countershaft drive gear 284 and a second layshaft or countershaft drive gear 286. The first layshaft or countershaft drive gear 284 selectively drives the first layshaft or countershaft 130 through the first friction clutch pack 128. The second layshaft or countershaft drive gear 286 selectively drives the second layshaft or countershaft 140 through the second friction clutch pack 138.

An output shaft 290 disposed between the countershafts 130 and 140 includes four output gears 292, 294 296 and 298 secured thereto. The first output gear 292 is in constant mesh with a first pair of gears, one gear 292A of such pair freely rotatably disposed on the first layshaft or countershaft 130 and the other gear 292B of such pair freely rotatably disposed on the second layshaft or countershaft 140. The second output gear 294 is in constant mesh with a second pair of gears, one gear 294A of such pair freely rotatably disposed on the first layshaft or countershaft 130 and the other gear 294B of such pair freely rotatably disposed on the second layshaft or countershaft 140. The third output gear 296 is in constant mesh with a third pair of gears, one gear 296A of such pair freely rotatably disposed on the first layshaft or countershaft 130 and the other gear 296B of such pair freely rotatably disposed on the second layshaft or countershaft 140. The fourth output gear 298 is in constant mesh with a fourth set of gears, a first gear 298A of such set freely rotatably disposed on the first layshaft or countershaft 130 and a second, idler gear 298B of such set engaging a third gear 298C freely rotatably disposed on the second layshaft or countershaft 140.

Between the gears 296B and 298C is disposed a first synchronizer clutch 302 translated by a first shift rail and fork assembly 234 and the first three-position hydraulic actuator 230. Between the gears 292B and 294B is disposed a second synchronizer clutch 304 translated by a second shift rail and fork assembly 244 and the second three-position hydraulic actuator 240. Between the gears 292A and 294A is disposed a third synchronizer clutch 306 translated by a third shift rail and fork assembly 264 and the third three-position hydraulic actuator 260. Between the gears 296A and 298A is disposed a fourth synchronizer clutch 308 translated by a fourth shift rail and fork assembly 274 and the fourth three-position hydraulic actuator 270.

It should also be appreciated that, as noted, the first three-position hydraulic actuator 230, the second three-position hydraulic actuator 240, the third three-position hydraulic actuator 260 and the fourth three-position hydraulic actuator 270 are all a three piston design which is capable of providing a positive intermediate position which corresponds to a Neutral position of each associated shift rail, fork and synchronizer. In order to ensure attainment of such Neutral position and maintain it when the actuators are not pressurized, detenting ball and ramp assemblies 310 are incorporated between the shift rails and the transmission housing. These detent assemblies 310 have a center hold or detent position and a ramp or flat on both sides of the detent.

The output shaft 290 is coupled to and drives a final drive assembly 312 such as a differential and drive axles (not illustrated).

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch automatic transmission comprising, in combination,
    means for controlling a flow of hydraulic fluid to a lock up clutch of a torque converter,
    a first pair of valves for independently controlling flows of hydraulic fluid to a respective pair of input clutches of such transmission,
    a manually activated valve for selectively inhibiting fluid flow to said first pair of valves,
    a second pair of valves for providing two independently controlled flows of hydraulic fluid,
    a first control valve for receiving said two flows of hydraulic fluid from said second pair of valves and alternately directing one of said flows to either a first or a second output while directing another of said flows to either a third or a fourth output,
    a second control valve for receiving hydraulic fluid flows from said second and said fourth outputs and alternately directing said fluid flow from said second output to either a first actuator input or a second actuator input while directing said fluid flow from said fourth output to either a third actuator input or a fourth actuator input, and
    a third control valve for receiving hydraulic fluid flows from said first and said third outputs and alternately directing said fluid flow from said first output to either a fifth actuator input or a sixth actuator input while directing said fluid flow from said third output to either a seventh actuator input or an eighth actuator input.

2. The hydraulic control system of claim 1 wherein said second actuator input and said fourth actuator input are on opposite ends of a first shift actuator and said first actuator input and said third actuator input are on opposite ends of a second shift actuator.

3. The hydraulic control system of claim 1 wherein said fifth actuator input and said seventh actuator input are on opposite ends of a third shift actuator and said sixth actuator input and said eighth actuator input are on opposite ends of a fourth shift actuator.

4. The hydraulic control system of claim 1 wherein said manually activated valve is activated by rotation of a selector shaft of said dual clutch automatic transmission.

5. The hydraulic control system of claim 1 further including a hydraulic pump and a hydraulic pressure regulator for receiving an output of said hydraulic pump.

6. The hydraulic control system of claim 1 wherein said means for controlling includes a control valve and a pressure regulator.

7. The hydraulic control system of claim 1 wherein such transmission includes an input shaft and a pair of countershafts and said pair of input clutches are operably disposed between said input shaft and said pair of countershafts.

8. A hydraulic control system for a dual clutch automatic transmission comprising, in combination,
    a hydraulic pump having an output,
    a hydraulic pressure regulator communicating with said output,
    a first pair of high flow valves for independently controlling flows of hydraulic fluid to a respective pair of input clutches of such transmission, a second pair of high flow valves for providing two independently controlled flows of hydraulic fluid, a first control valve for receiving said two flows of hydraulic fluid from said second pair of valves and alternately directing one of said flows to either a first or second output while directing another of said flows to either a third or a fourth output, a second control valve for receiving hydraulic fluid flows from said second and said fourth outputs and alternately directing said fluid flow from said second output to a first input of one of a first shift actuator or a second shift actuator while directing said fluid flow from said fourth output to a second input of one of said first or said second shift actuators and a third control valve for receiving hydraulic fluid flows from said first and said third outputs and alternately directing said fluid flow from said third output to one of a first input of a third shift actuator or a fourth shift actuator while directing said fluid flow from said third output to a second input of said third or said fourth shift actuators.

9. The hydraulic control system of claim 8 further including means for controlling a flow of hydraulic fluid to a lock up clutch of a torque converter.

10. The hydraulic control system of claim 8 further including a manually activated valve for selectively inhibiting fluid flow to said first pair of valves.

11. The hydraulic control system of claim 8 wherein such transmission includes an input shaft, a pair of countershafts and a pair of hydraulic operators operably associated with said pair of input clutches.

12. The hydraulic control system of claim 8 wherein each of said input clutches is driven through an input transfer gear and drives a countershaft.

13. The hydraulic control system of claim 8 further including a torque converter having a hydraulic actuator and a fourth control valve for providing and releasing pressurized hydraulic fluid to said hydraulic actuator of said torque converter.

14. The hydraulic control system of claim 8 wherein said shift actuators include three pistons.

15. A hydraulic control system for a dual clutch automatic transmission comprising, in combination, means for supplying pressurized hydraulic fluid, a first pair of valves for controlling flows of hydraulic fluid to a respective pair of input clutches of such transmission, a second pair of valves for providing two independently controlled flows of hydraulic fluid, a first control valve for receiving said two flows of hydraulic fluid and alternately directing one of said flows to either a first or a second output while directing another of said flows to either a third or a fourth output, a second control valve for receiving hydraulic fluid flows from said second and said fourth outputs and alternately directing said fluid flow from said second output to a first input of either a first shift actuator or a second shift actuator while directing said fluid flow from said fourth output to a second input of either said first shift actuator or said second shift actuator, a third control valve for receiving hydraulic fluid flows from said first and third outputs and alternately directing said fluid flow from said first output to a first input of either a third shift actuator or a fourth shift actuator while directing said fluid flow from said third output to a second input or either said third shift actuator or said fourth shift actuator, and a fourth control valve for selectively supplying hydraulic fluid to an actuator of a torque converter.

16. The hydraulic control system of claim 15 further including a torque converter operatively associated with said torque converter actuator.

17. The hydraulic control system of claim 15 further including a manually activated valve for selectively inhibiting fluid flow to said first pair of valves.

18. The hydraulic control system of claim 15 further including a hydraulic pressure regulator for controlling a pressure of said pressurized hydraulic fluid.

19. The hydraulic control system of claim 15 wherein such transmission includes an input shaft and a pair of countershafts and said pair of clutches are operably disposed between said input shaft and said pair of countershafts.

20. The hydraulic control system of claim 15 wherein said shift actuators include a main piston having disparate end areas and an annular piston associated with one end of said main piston wherein said main piston is coupled to a shift rail and fork assembly.

* * * * *